(12) United States Patent
Wang

(10) Patent No.: US 6,877,760 B2
(45) Date of Patent: Apr. 12, 2005

(54) FOLDABLE STROLLER

(75) Inventor: Jui-Lu Wang, Taipei (TW)

(73) Assignee: Mission Hills Investment Corporation, Cayman Islands (KN)

( * ) Notice: Subject to any disclaimer, the term of this patent is extended or adjusted under 35 U.S.C. 154(b) by 120 days.

(21) Appl. No.: 10/457,923

(22) Filed: Jun. 9, 2003

(65) Prior Publication Data

US 2004/0245748 A1 Dec. 9, 2004

(51) Int. Cl.⁷ .................................................. B62B 1/00
(52) U.S. Cl. ...................................................... 280/642
(58) Field of Search ................................ 280/642, 647, 280/643, 648, 649, 650, 657, 658, 644; 16/113.1; 74/501.6

(56) References Cited

U.S. PATENT DOCUMENTS

| | | | | |
|---|---|---|---|---|
| 5,511,441 A | * | 4/1996 | Arai ........................... | 74/501.6 |
| 5,524,503 A | * | 6/1996 | Ishikura ...................... | 74/501.6 |
| 5,709,400 A | * | 1/1998 | Bonnier et al. .............. | 280/650 |
| 6,129,373 A | * | 10/2000 | Cheng ......................... | 280/650 |
| 6,339,862 B1 | * | 1/2002 | Cheng ......................... | 280/647 |
| 6,422,587 B1 | * | 7/2002 | Yamazaki et al. ........... | 280/647 |
| 6,443,479 B2 | * | 9/2002 | Huang ......................... | 280/642 |
| 6,464,242 B2 | * | 10/2002 | Suzuki ........................ | 280/642 |
| 6,478,328 B1 | * | 11/2002 | Yeh et al. .................... | 280/650 |
| 6,485,216 B1 | * | 11/2002 | Cheng ......................... | 280/650 |
| 6,739,616 B2 | * | 5/2004 | Lin ............................. | 280/642 |
| 6,752,413 B2 | * | 6/2004 | Yamazaki et al. ........... | 280/647 |
| 2004/0207180 A1 | * | 10/2004 | Hsia ............................ | 280/647 |

\* cited by examiner

*Primary Examiner*—Bryan Fischmann
(74) *Attorney, Agent, or Firm*—David N. Lathrop, Esq.; Gallagher & Lathrop

(57) ABSTRACT

A foldable stroller includes two locking devices for locking a frame body in an extended position, and a twist actuator mounted on and rotatable relative to a grip and having two cam paths disposed on an inner shell surface thereof. Two cam followers are interposed between the grip and the twist actuator, and have cam surfaces to confront and slidably engage the cam paths so as to move the cam followers along an axis when the twist actuator is rotated. Two keys are secured by the cam followers and extend radially and inwardly to be inserted into and slidable along two keyways formed in the grip. Two pulling cords respectively connect the keys with the locking devices to pull the locking devices so as to unlock the frame body when the cam followers are moved. A retaining member is disposed to prevent movement of the cam followers, and is manually operable to move radially.

8 Claims, 9 Drawing Sheets

FOLDABLE STROLLER

BACKGROUND OF THE INVENTION

1. Field of the Invention

This invention relates to a foldable stroller, more particularly to a foldable stroller which can be folded by using only one hand.

2. Description of the Related Art

In a conventional foldable stroller with one hand release mechanism, a pair of locking devices are mounted on a frame to lock the frame in an extended position. A release mechanism is mounted on a handle of the frame, and includes a moving member which is rotatably mounted on the handle between locked and unlocked positions and which is formed with two pairs of helical grooves, a pair of slots which are formed through the handle and which are parallel to each other, and a pair of pulling members which are movably disposed relative to the handle and which are operably connected to the locking devices. The pulling members include a pair of pins, each of which is guided in the respective slot in the handle and has two opposite ends that extend outwardly of the handle and that are guided in the respective pair of the helical grooves in the moving member such that the pins are moved linearly in opposing directions when the moving member is rotated to the unlocked position so as to operate the locking devices to unlock the frame. However, the sliding of the pins along the helical grooves will cause wear of inner walls defining the helical grooves, thereby resulting in unsteady sliding of the pins. Moreover, the opposing ends of the pins are liable to disengage from the helical grooves.

SUMMARY OF THE INVENTION

The object of the present invention is to provide a foldable stroller with a release mechanism that can be operated steadily and that has a sturdy construction.

According to this invention, the foldable stroller comprises a frame that includes a frame body configured to be foldable between extended and collapsed positions, a handle having a pair of side handle portions which are connected to the frame body, which are spaced apart from each other in an axial direction, and which extend in an upright direction transverse to the axial direction, and a grip having left and right ends which are opposite to each other in the axial direction and which are connected to the side handle portions distal from the frame body, and an outer surrounding surface which surrounds an axis in the axial direction to define therein a passageway along the axis, and which has two keyways that are displaced from each other in the axial direction and that extend radially to be communicated with the passageway.

A pair of locking devices are mounted on the frame body to lock the frame body in the extended position, and are disposed respectively proximate to the side handle portions of the handle.

A twist actuator is mounted on and is disposed radially and outwardly of the outer surrounding surface of the grip, and is rotatable relative to the grip about the axis between a locked position and an unlocked position. The twist actuator has inner and outer shell surfaces opposite to each other in radial directions relative to the axis, a through hole which extends from the inner shell surface through the outer shell surface, and two cam paths which are disposed on the inner shell surface and which are displaced from each other in the axial direction.

Left and right cam followers are interposed between the outer surrounding surface of the grip and the inner shell surface of the twist actuator, and are spaced apart from each other in the axial direction. Each of the left and right cam followers has a key positioning end and a cam surface which is opposite to the key positioning end in the axial direction, and which confronts and slidably engages a respective one of the cam paths such that when the twist actuator is rotated about the axis from the locked position to the unlocked position, each of the left and right cam followers is moved along the axis from a first position to a second position.

A pair of keys are disposed to be secured by the key positioning ends of the left and right cam followers, respectively, and to extend towards the axis so as to be inserted into and slidable along the keyways, respectively, when the left and right cam followers are respectively moved between the first and second positions.

A pair of pulling cords are disposed to pass through the passageway. Each of the pulling cords has first and second cord ends which are respectively connected to a respective one of the keys and a respective one of the locking devices, such that when the left and right cam followers are moved from the first position to the second position, each of the locking devices is jerked by the respective one of the pulling cords to unlock the frame body so as to permit the frame body to be placed in the collapsed position.

A retaining member is disposed to be sleeved on the grip, and is movable radially of the left and right cam followers between actuable and depressed positions. The retaining member has a retaining portion which is disposed outboard to one of the key positioning ends to prevent the key positioning ends of the left and right cam followers from moving towards the second position when the retaining member is in the actuable position, and an operating portion which is radially opposite to the retaining portion and which extends outwardly of the twist actuator through the through hole to be operated manually to move the retaining member to the depressed position so as to place the retaining portion radially and outwardly of the key positioning ends, thereby permitting rotation of the twist actuator from the locked position to the unlocked position.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 2:
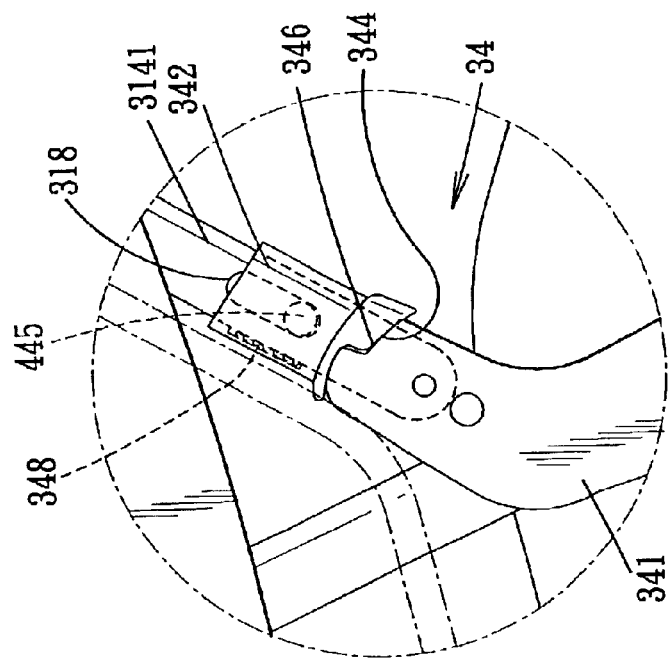
FIG. 2 is a schematic view showing a locking device of the first preferred embodiment.

Before the present invention is described in greater detail, it should be noted that same reference numerals have been used to denote like elements throughout the specification.

Figure 1:
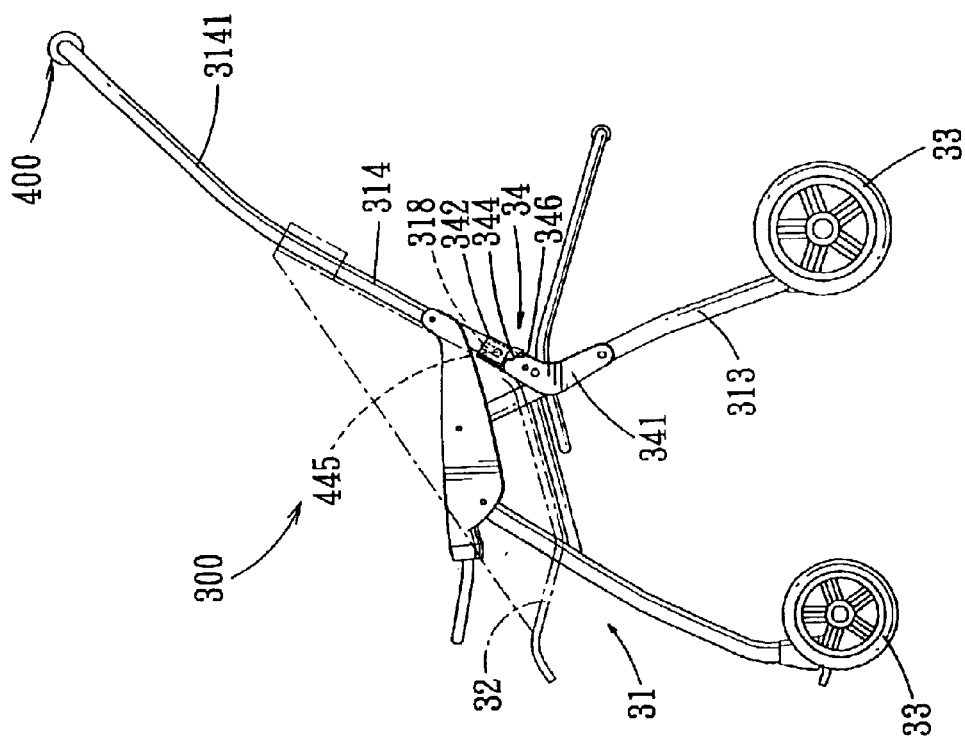
FIG. 1 is a schematic side view of the first preferred embodiment of a foldable stroller according to this invention when expanded.
Figure 3:
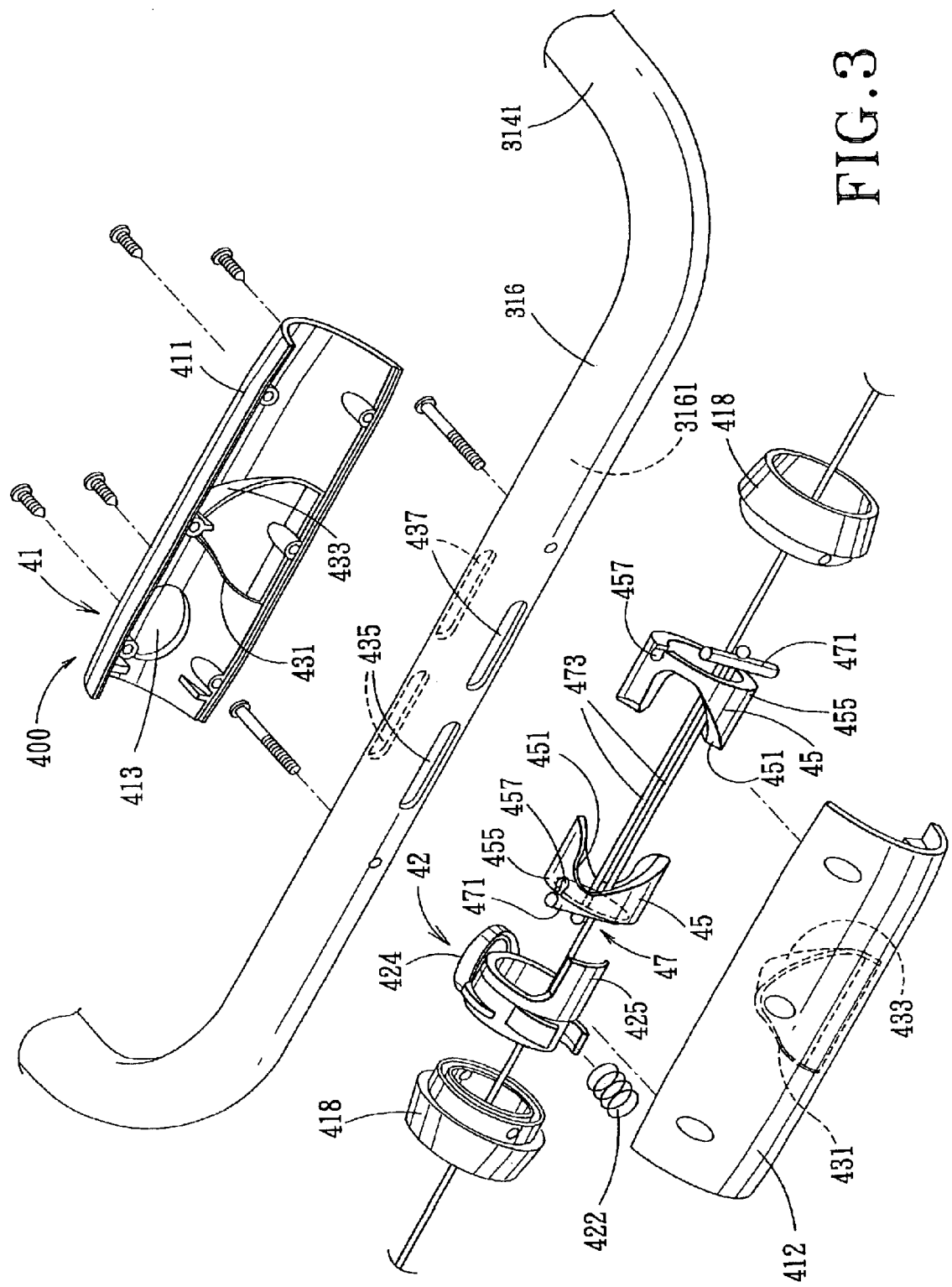
FIG. 3 is an exploded perspective view of a release mechanism of the first preferred embodiment.

Referring to FIGS. 1 to 3, the first preferred embodiment of a foldable stroller 300 according to the present invention is shown to comprise a frame 31, a pair of locking devices 34, and a release mechanism 400.

The frame 31 includes a frame body 313 which is configured to be foldable between an extended position and a collapsed position in a known manner, a seat member 32 which is mounted on the frame body 313, two pairs of wheels 33 which are rotatably mounted on the frame body 313, a handle 314 which has a pair of side handle portions 3141 that are connected to the frame body 313, that are spaced apart from each other in an axial direction, and that extend in an upright direction transverse to the axial direction, and a grip 316 which has left and right ends that are opposite to each other in the axial direction and that are connected to the side handle portions 3141 distal from the frame body 313. The grip 316 has an outer surrounding surface which surrounds an axis in the axial direction to define therein a passageway 3161 along the axis, and which has two left elongate slots 435 and two right elongate slots 437 that are displaced from each other in the axial direction and that extend radially to be communicated with the passageway 3161. Each of the left and right elongate slots 435,437 extends in the axial direction so as to serve as a keyway.

As shown in FIGS. 1 and 2, each of the locking devices 34 includes a first coupling member 341 which is mounted on the frame body 313, and which has a first coupling wall 344 that faces in the upright direction, and a second coupling member 342 which is sleeved on a respective one of the side handle portions 3141, and which has a second coupling wall 346 that is biased by a biasing spring 348 to abut against the first coupling wall 344 so as to lock the frame body 313 in the extended position.

As shown in FIG. 3, the release mechanism 400 includes a twist actuator 41, left and right cam followers 45, a pair of keys 471, a pair of pulling cords 473, and a retaining member 42.

The twist actuator 41 is mounted on and is disposed radially and outwardly of the outer surrounding surface of the grip 316, and is rotatable relative to the grip 316 about the axis between a locked position and an unlocked position. The twist actuator 41 is of a tubular form, and is constituted by upper and lower halves 411,412 which are in symmetry relative to the axis and which are retained by two end caps 418. In addition, the twist actuator 41 has inner and outer shell surfaces opposite to each other in radial directions relative to the axis, a through hole 413 which extends from the inner shell surface through the outer shell surface, and two protrusions 431,433 which are disposed on the inner shell surface and which are displaced from each other in the axial direction. Each of the protrusions 431,433 extends along a first winding route to define a cam path.

The left and right cam followers 45 are interposed between the outer surrounding surface of the grip 316 and the inner shell surface of the twist actuator 41, and are spaced apart from each other in the axial direction. Each of the left and right cam followers 45 has a key positioning end 455 and a cam surface 451 which is opposite to the key positioning end 455 in the axial direction. In this embodiment, the key positioning ends 455 of the left and right cam followers 45 are disposed outboard to the respective cam surfaces 451. The cam surface 451 extends along a second winding route to confront and to slidably engage a respective one of the cam paths. As such, when the twist actuator 41 is rotated about the axis from the locked position to the unlocked position, each of the left and right cam followers 45 is moved along the axis from a first position to a second position. The key positioning end 455 has two diametrically opposite holes 457.

Each of the keys 471 has two opposite ends respectively inserted into the holes 457 in the key positioning end 455 of a respective one of the left and right cam followers 45 so as to be secured thereby. Each of the keys 471 extends through and is slidable along the respective ones of the left and right elongate slots 435,437 when the left and right cam followers 45 are respectively moved between the first and second positions.

The pulling cords 473 are disposed to pass through the passageway 3161 in the grip 316. Each of the pulling cords 473 has a first cord end which is connected to a respective one of the keys 471. Specifically, one of the pulling cords 473 has the first cord end connected to the key 471 which is secured to the left cam follower 45, and a second cord end extending beyond the right end of the grip 316 to one of the side handle portions 3141. The other one of the pulling cords 473 has the first cord end connected to the key 471 which is secured to the right cam follower 45, and a second cord end extending beyond the left end of the grip 316 to the other one of the side handle portions 3141.

Figure 8:
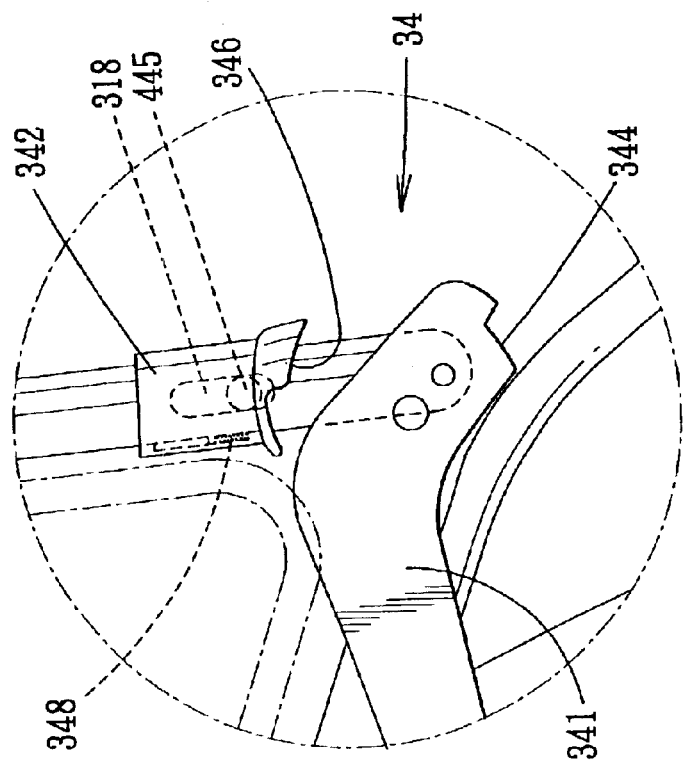
FIG. 8 is a schematic view showing the locking device in the state shown in FIG. 7.
Figure 7:
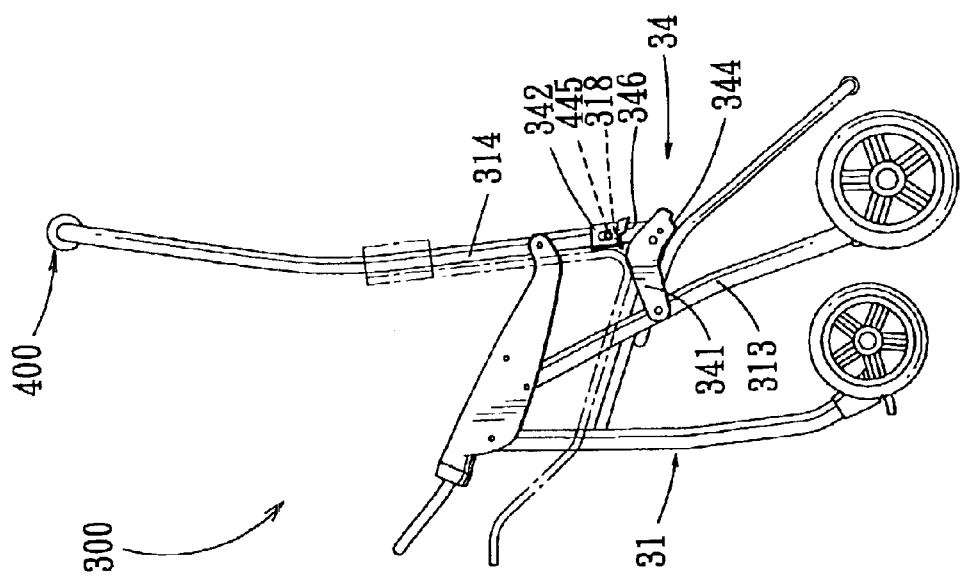
FIG. 7 is a schematic side view of the first preferred embodiment when being folded.

With reference to FIG. 2, each of the locking devices 34 further includes a pin 445 which is connected to the second cord end of a respective one of the pulling cords 473, which is secured to the second coupling member 342, and which is slidable along an elongate slot 318 formed in the respective side handle portion 3141. Thus, when the left and right cam followers 45 are moved from the first position to the second position, that is, the cam surfaces 451 of the left and right cam followers 45 are moved away from each other, the second coupling member 342 of a respective one of the locking devices 34 is pulled by the pin 445 which is moved along the slot 318 by the second cord end of the respective pulling cord 473 to be away from the first coupling member 341 of the respective one of the locking devices 34. As a result, the second coupling wall 346 is disengaged from the first coupling wall 344 so as to permit the frame body 313 to be placed in the collapsed position, as shown in FIGS. 7 and 8.

Figure 4:
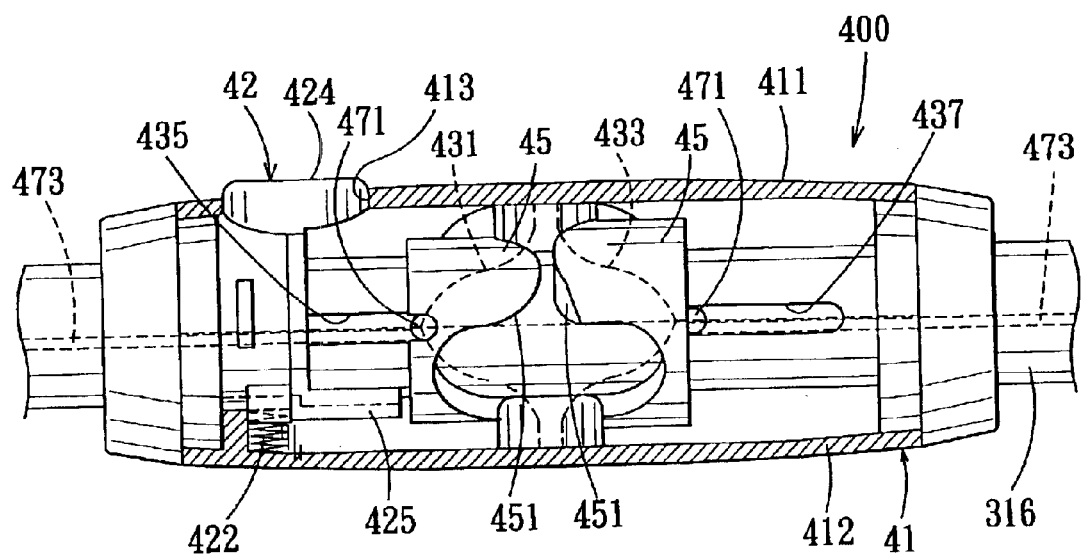
FIG. 4 is a fragmentary, partly sectional view of the release mechanism of the first preferred embodiment in a locked state.
Figure 5:
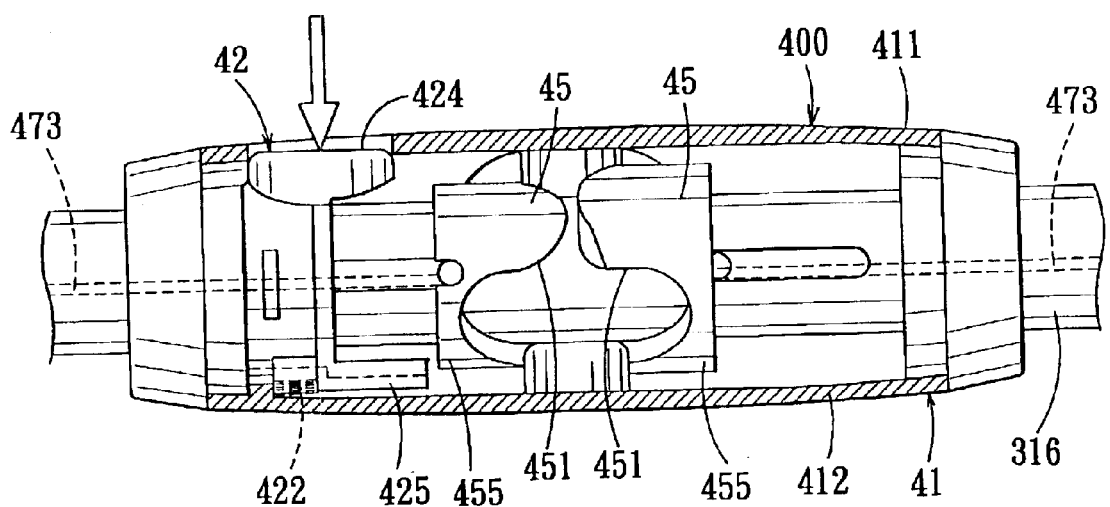
FIG. 5 is a fragmentary, partly sectional view similar to FIG. 4 but in a depressed state.

The retaining member 42 is sleeved on the grip 316, and is movable radially of the left and right cam followers 45 between actuable and depressed positions shown in FIGS. 4 and 5, respectively. The retaining member 42 has a retaining portion 425 which is disposed outboard to one of the key positioning ends 455 to prevent the key positioning ends 455 of the left and right cam followers 45 from moving towards the second position when the retaining member 42 is in the actuable position (see FIG. 4), and an operating portion 424 which is radially opposite to the retaining portion 425 and which extends outwardly of the twist actuator 41 through the through hole 413 to be operated manually. When the operating portion 424 is pressed to move the retaining member 42 to the depressed position, as shown in FIG. 5, the retaining portion 425 is disposed radially and outwardly of the key positioning ends 455, thereby permitting rotation of the twist actuator 41 from the locked position to the unlocked position. A biasing member 422, such as a biasing spring, is disposed between the inner shell surface of the twist actuator 41 and the retaining member 42 to bias the retaining member 42 towards the actuable position.

Figure 6:
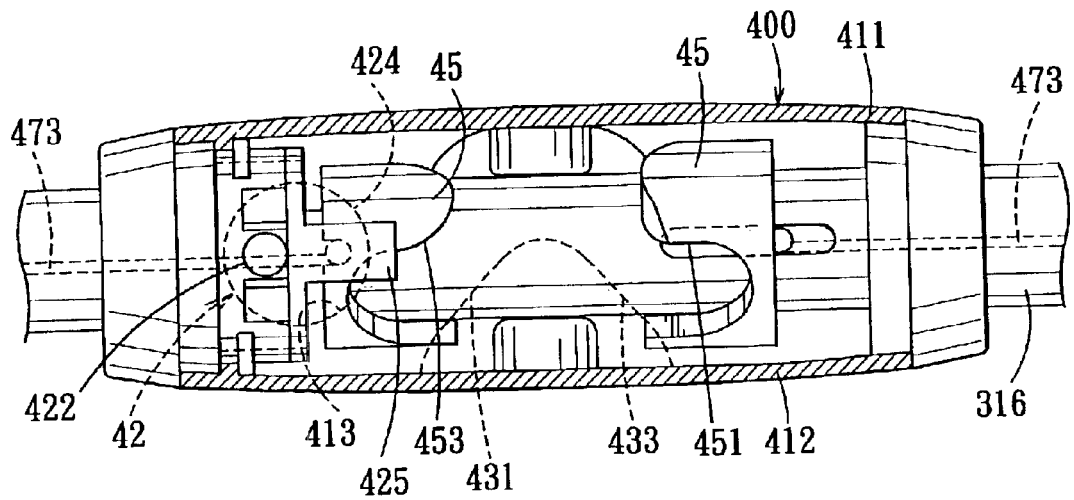
FIG. 6 is a fragmentary, partly sectional view similar to FIG. 4 but in an unlocked state.
Figure 9:
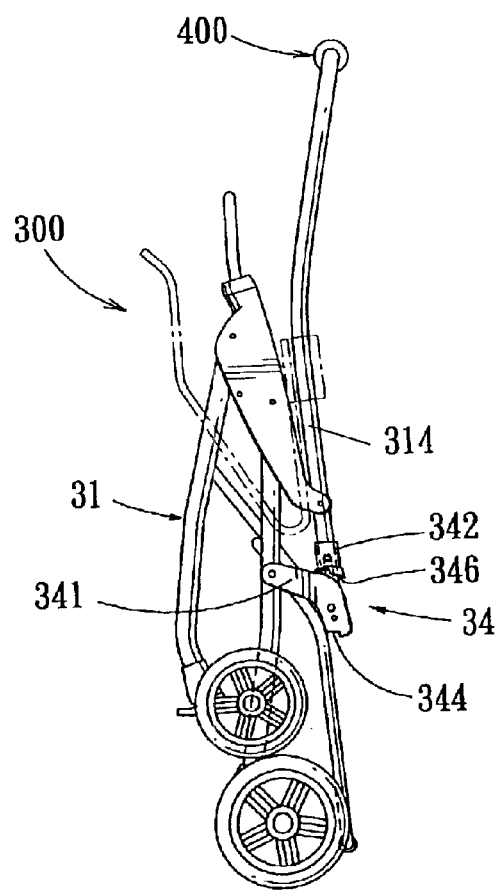
FIG. 9 is a schematic side view of the first preferred embodiment when folded.

When the foldable stroller 300 is to be folded, the user holds the twist actuator 41 by using one hand, and presses the operating portion 424 against the biasing action of the biasing member 422 so that the operating portion 424 moves from the position shown in FIG. 4 to the position shown in FIG. 5, thereby permitting rotation of the twist actuator 41. The user then rotates the twist actuator 41 with the same hand from the locked position to the unlocked position shown in FIG. 6 such that the left and right cam followers 45 are moved from the first position to the second position, i.e. away from each other, to pull the second coupling members 342 to disengage from the first coupling members 341, thereby permitting the frame body 313 to be placed in the collapsed position (see FIG. 9) for convenient carrying and storage of the stroller 300. When the user releases the twist actuator 41, the twist actuator 41 is moved toward the locked position by means of the biasing action of the biasing member 348.

Figure 10:
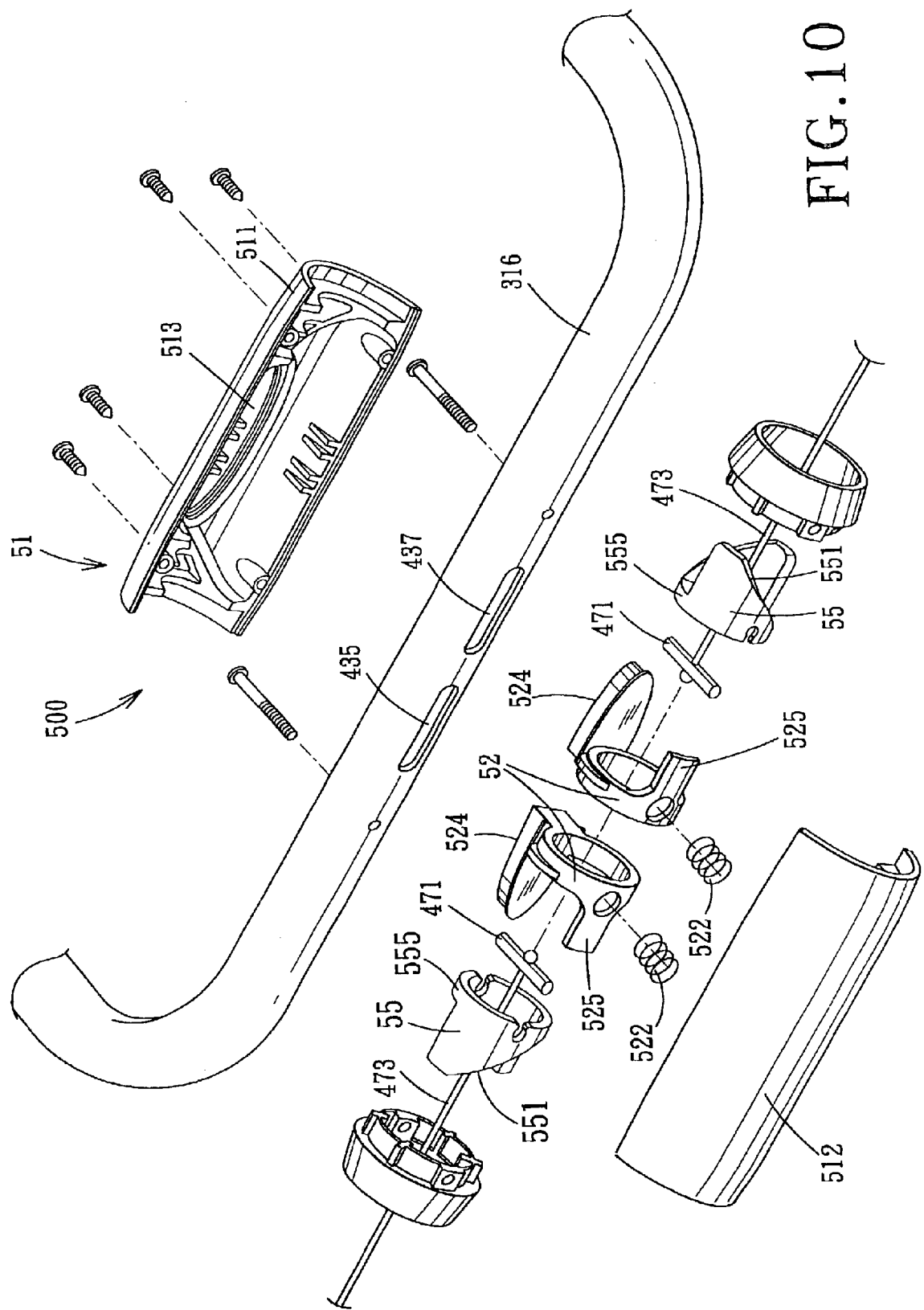
FIG. 10 is an exploded perspective view of a release mechanism the second preferred embodiment of a foldable stroller according to this invention.
Figure 11:
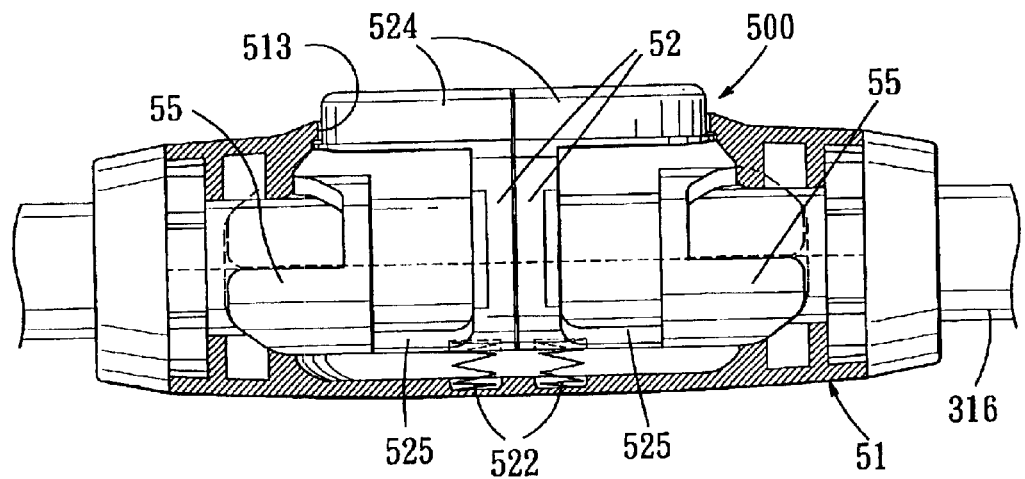
FIG. 11 is a fragmentary, partly sectional view of the release mechanism of the second preferred embodiment in a locked state.
Figure 12:
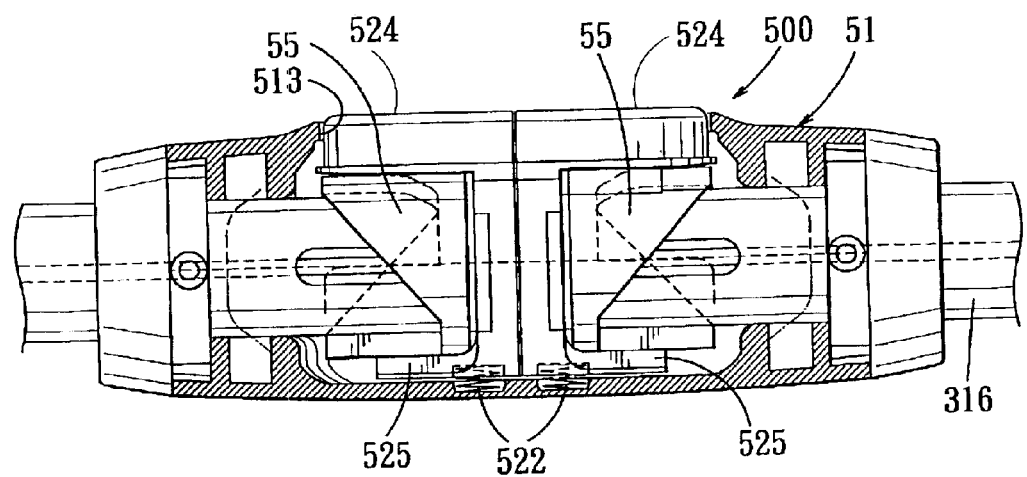
FIG. 12 is a fragmentary, partly sectional view similar to FIG. 11 but in a depressed state.

FIGS. 10, 11 and 12 show a release mechanism 500 of the second preferred embodiment of a release mechanism 500 according to this invention, which is similar to that of the first preferred embodiment. As shown, the release mechanism 500 includes a twist actuator 51 with upper and lower halves 511,512 and a through hole 513, left and right cam followers 55, a pair of keys 471, a pair of pulling cords 473, and two retaining members 52.

The key positioning ends 555 of the left and right cam followers 55 are disposed inboard to the cam surfaces 551 of the left and right cam followers 55 such that when each of the left and right cam followers 55 is moved from the first position to the second position, the cam surfaces 551 are moved towards each other. In addition, only one left elongate slot 435 and only one right elongate slot 437 are formed in the grip 316 for slidable insertion of the keys 471.

The two retaining members 52 are provided to enhance safety. Each retaining member 52 also includes a retaining portion 525 to retain the respective key positioning end 555, and an operating portion 524 extending outwardly through the through hole 513 to be operated manually. Two biasing members 522 are disposed to respectively bias the retaining members 52 towards the actuable position. Due to the provision of the two retaining members 52, the user has to press both of the operating portions 524 to the position shown in FIG. 12 in order to permit rotation of the twist actuator 51. Thus, undesired rotation of the twist actuator 51 can be prevented.

Figure 13:
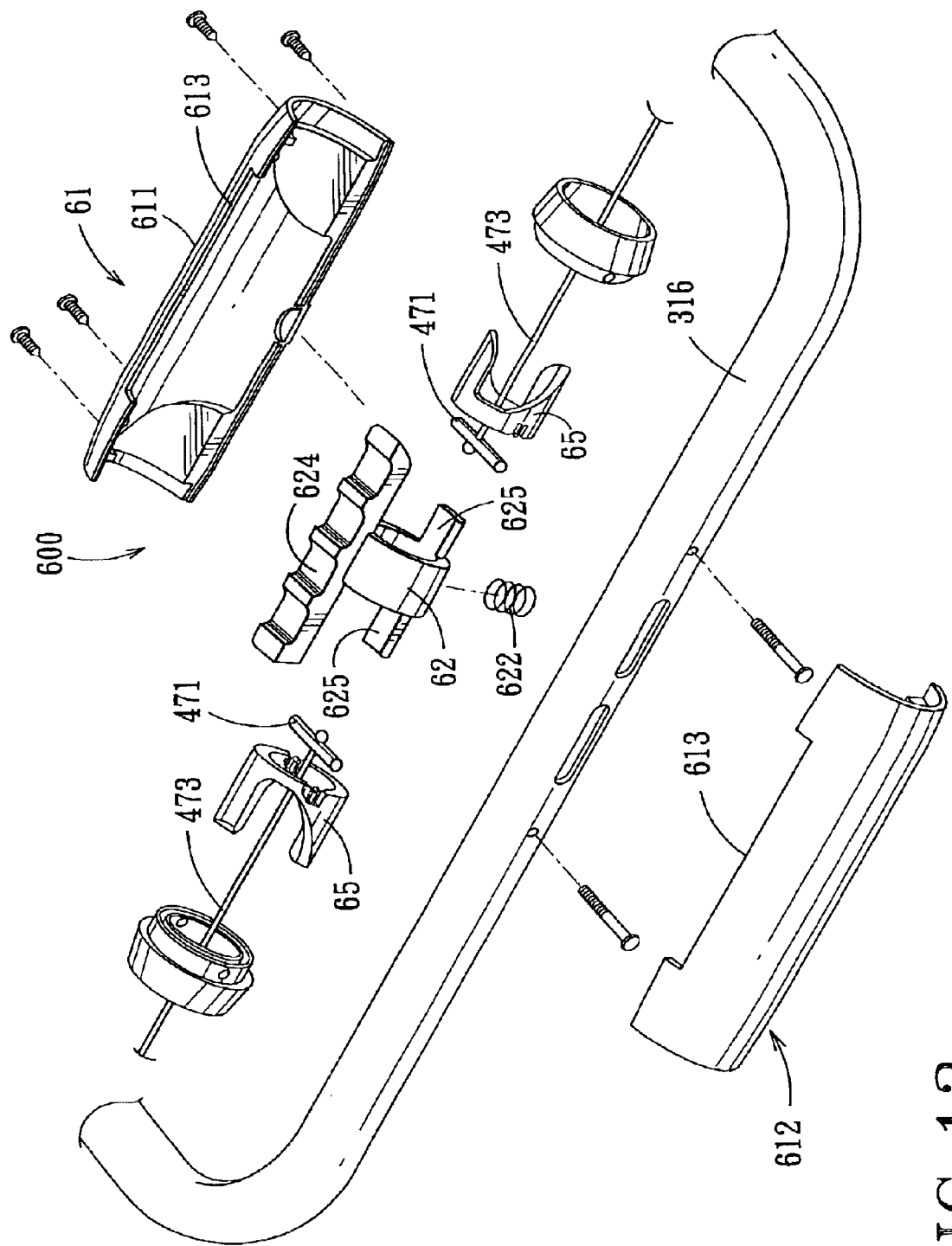
FIG. 13 is an exploded perspective view of a release mechanism of the third preferred embodiment of a foldable stroller according to this invention.
Figure 14:
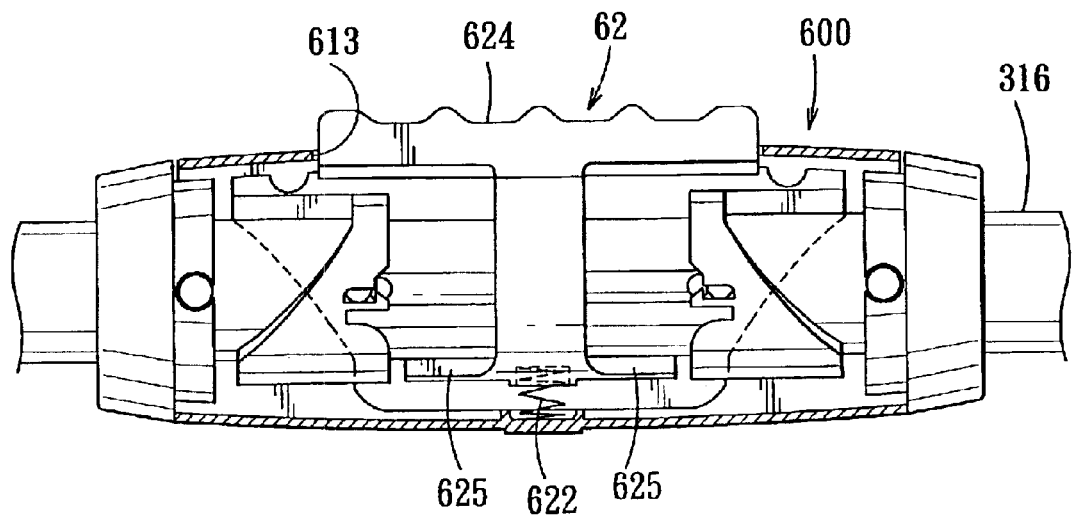
FIG. 14 is a fragmentary, partly sectional view of the release mechanism of the third preferred embodiment in a locked state.
Figure 15:
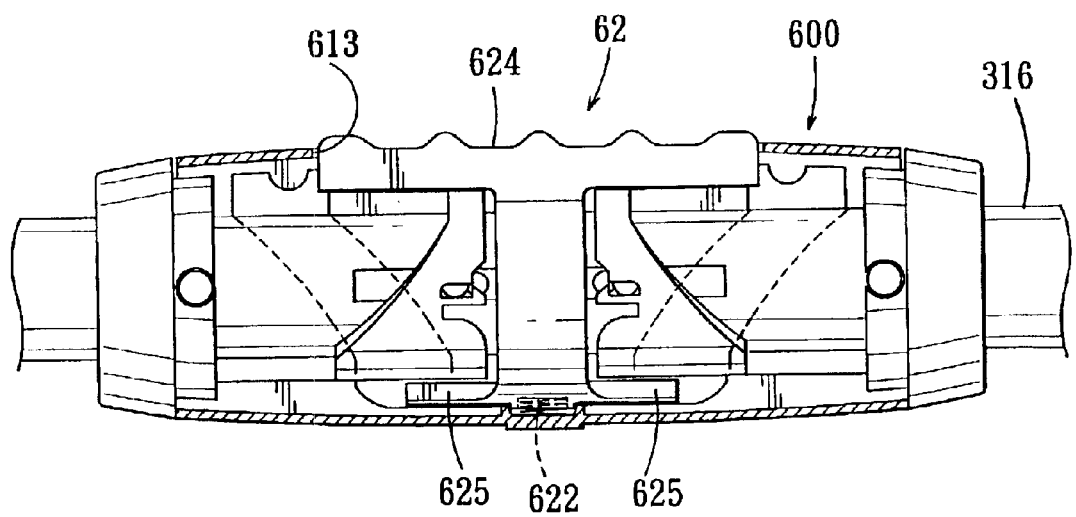
FIG. 15 is a fragmentary, partly sectional view similar to FIG. 14 but in a depressed state.

FIGS. 13, 14 and 15 show a release mechanism 600 of the third preferred embodiment of a foldable stroller according to this invention, which is similar to that of the second preferred embodiment. As shown, the release mechanism 600 includes a twist actuator 61 with upper and lower halves 611,612 and a through hole 613 that is confined by two inner edge surfaces of the upper and lower halves 611,612, left and right cam followers 65, a pair of keys 471, a pair of pulling cords 473, and a retaining member 62. The retaining member 62 has two retaining portions 625 to retain the left and right cam followers 65, and an operating portion 624 with an outer surface configured to be held by four fingers of the user. A biasing member 622 is disposed to bias the retaining member 62 towards the actuable position shown in FIG. 14.

As illustrated, through the sliding engagement of the cam surfaces 451 with the cam paths defined by the protrusions 431,433, the left and right cam followers 45,55,65 can be moved steadily along the axis from the first position to the second position, and undesirable disengagement of the left and right cam followers 45,55,65 from the twist actuator 41,51,61 can be prevented. Furthermore, due to the provision of the retaining member(s) 42,52,62, undesired folding of the stroller 300 is prevented.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:
1. A foldable stroller comprising:
   a frame including
      a frame body configured to be foldable between an extended position and a collapsed position,
      a handle having a pair of side handle portions which are connected to said frame body, which are spaced apart from each other in an axial direction, and which extend in an upright direction transverse to the axial direction, and
      a grip having left and right ends which are opposite to each other in the axial direction and which are connected to said side handle portions distal from said frame body, and an outer surrounding surface which surrounds an axis in the axial direction to define therein a passageway along the axis, and which has two keyways that are displaced from each other in the axial direction and that extend radially to be communicated with said passageway;
   a pair of locking devices mounted on said frame body to lock said frame body in the extended position, and disposed respectively proximate to said side handle portions of said handle;
   a twist actuator mounted on and disposed radially and outwardly of said outer surrounding surface of said grip, and rotatable relative to said grip about the axis between a locked position and an unlocked position, said twist actuator having inner and outer shell surfaces opposite to each other in radial directions relative to the axis, a through hole which extends from said inner shell surface through said outer shell surface, and two cam paths which are disposed on said inner shell surface and which are displaced from each other in the axial direction;
   left and right cam followers interposed between said outer surrounding surface of said grip and said inner shell surface of said twist actuator, and spaced apart from each other in the axial direction, each of said left and right cam followers having a key positioning end and a cam surface which is opposite to said key positioning end in the axial direction, and which confronts and slidably engages a respective one of said cam paths such that when said twist actuator is rotated about the axis from the locked position to the unlocked position, each of said left and right cam followers is moved along the axis from a first position to a second position;

a pair of keys disposed to be secured by said key positioning ends of said left and right cam followers, respectively, and to extend towards the axis so as to be inserted into and slidable along said keyways, respectively, when said left and right cam followers are respectively moved between the first and second positions;

a pair of pulling cords disposed to pass through said passageway, each of said pulling cords having first and second cord ends which are respectively connected to a respective one of said keys and a respective one of said locking devices, such that when said left and right cam followers are moved from the first position to the second position, each of said locking devices is jerked by the respective one of said pulling cords to unlock said frame body so as to permit said frame body to be placed in the collapsed position; and a retaining member disposed to be sleeved on said grip and movable radially of said left and right cam followers between actuable and depressed positions, said retaining member having a retaining portion which is disposed outboard to one of said key positioning ends to prevent said key positioning ends of said left and right cam followers from moving towards the second position when said retaining member is in the actuable position, and an operating portion which is radially opposite to said retaining portion and which extends outwardly of said twist actuator through said through hole to be operated manually to move said retaining member to the depressed position so as to place said retaining portion radially and outwardly of said key positioning ends, thereby permitting rotation of said twist actuator from the locked position to the unlocked position.

2. The foldable stroller according to claim 1, further comprising a biasing member disposed between said inner shell surface of said twist actuator and said retaining member so as to bias said retaining member towards the actuable position.

3. The foldable stroller according to claim 2, wherein each of said cam paths extends along a first winding route, and said cam surface of each of said left and right cam followers extends along a second winding route to slidably engage the respective one of said cam paths.

4. The foldable stroller according to claim 2, wherein said key positioning end of each of said left and right cam followers has two diametrically opposite holes such that a respective one of said keys is inserted into said holes so as to be secured by said key positioning end.

5. The foldable stroller according to claim 4, wherein said key positioning ends of said left and right cam followers are disposed outboard to said cam surfaces of said left and right cam followers such that when each of said left and right cam followers is moved from the first position to the second position, said cam surfaces of said left and right cam followers are moved away from each other, said first cord end of one of said pulling cords being connected to one of said keys which is secured to said left cam follower such that said second cord end of said one of said pulling cords extends beyond said right end of said grip so as to be connected to a respective one of said locking devices, said first cord end of the other one of said pulling cords being connected to the other one of said keys which is secured to said right cam follower such that said second cord end of said other one of said pulling cords extends beyond said left end of said grip so as to be connected to a respective one of said locking devices.

6. The foldable stroller according to claim 4, wherein said key positioning ends of said left and right cam followers are disposed inboard to said cam surfaces of said left and right cam followers, such that when each of said left and right cam followers is moved from the first position to the second position, said cam surfaces of said left and right cam followers are moved towards each other.

7. The foldable stroller according to claim 1, wherein said twist actuator is of tubular form, and is constituted by upper and lower halves which are in symmetry relative to the axis.

8. The foldable stroller according to claim 1, wherein each of said locking devices includes a first coupling member mounted on said frame body, and having a first coupling wall which faces in the upright direction, a second coupling member mounted on a respective one of said side handle portions, and having a second coupling wall which abuts against said first coupling wall to lock said frame body in the extended position, a pin connected to said second cord end of a respective one of said pulling cords and secured to said second coupling member such that when said left and right cam followers are moved from the first position to the second position, said second coupling member is pulled by said second cord end of the respective one of said pulling cords to enable said second coupling wall to disengage from said first coupling wall, thereby permitting said frame body to be placed in the collapsed position, and a biasing member disposed to bias said second coupling wall to abut against said first coupling wall.

* * * * *